United States Patent [19]

Theckston

[11] 4,441,318

[45] Apr. 10, 1984

[54] METHOD AND APPARATUS FOR OBTAINING WORK FROM HEAT ENERGY

[76] Inventor: Alexander Theckston, 10 Emden Crescent, Mulgrave, 3170, Victoria, Australia

[21] Appl. No.: 389,065

[22] Filed: Jun. 16, 1982

Related U.S. Application Data

[63] Continuation-in-part of Ser. No. 66,232, Aug. 13, 1979, abandoned.

[30] Foreign Application Priority Data

Aug. 14, 1978 [AU] Australia ................................. 5495

[51] Int. Cl.³ .............................................. F03G 7/06
[52] U.S. Cl. ...................................... 60/527; 60/530; 60/641.8
[58] Field of Search ................ 60/325, 327, 527, 528, 60/530, 641.8

[56] References Cited

U.S. PATENT DOCUMENTS 4,235,075  11/1980  Erb .................................... 60/325 X

FOREIGN PATENT DOCUMENTS

| 46-42523 | 12/1971 | Japan | 60/530 |
| 176510 | 3/1922 | United Kingdom | 60/530 |
| 326029 | 3/1930 | United Kingdom | 60/530 |

Primary Examiner—Allen M. Ostrager
Assistant Examiner—Stephen F. Husar
Attorney, Agent, or Firm—Bernard, Rothwell & Brown

[57] ABSTRACT

The present invention provides a method of obtaining mechanical work from heat energy comprising heating a body of metal or metal alloy confined within a pressure vessel having a coefficient of volume expansion less than said body of metal or metal alloy contained therein to generate an increase in pressure within the vessel and causing the increased pressure to move a load thereby to do work.

16 Claims, 3 Drawing Figures

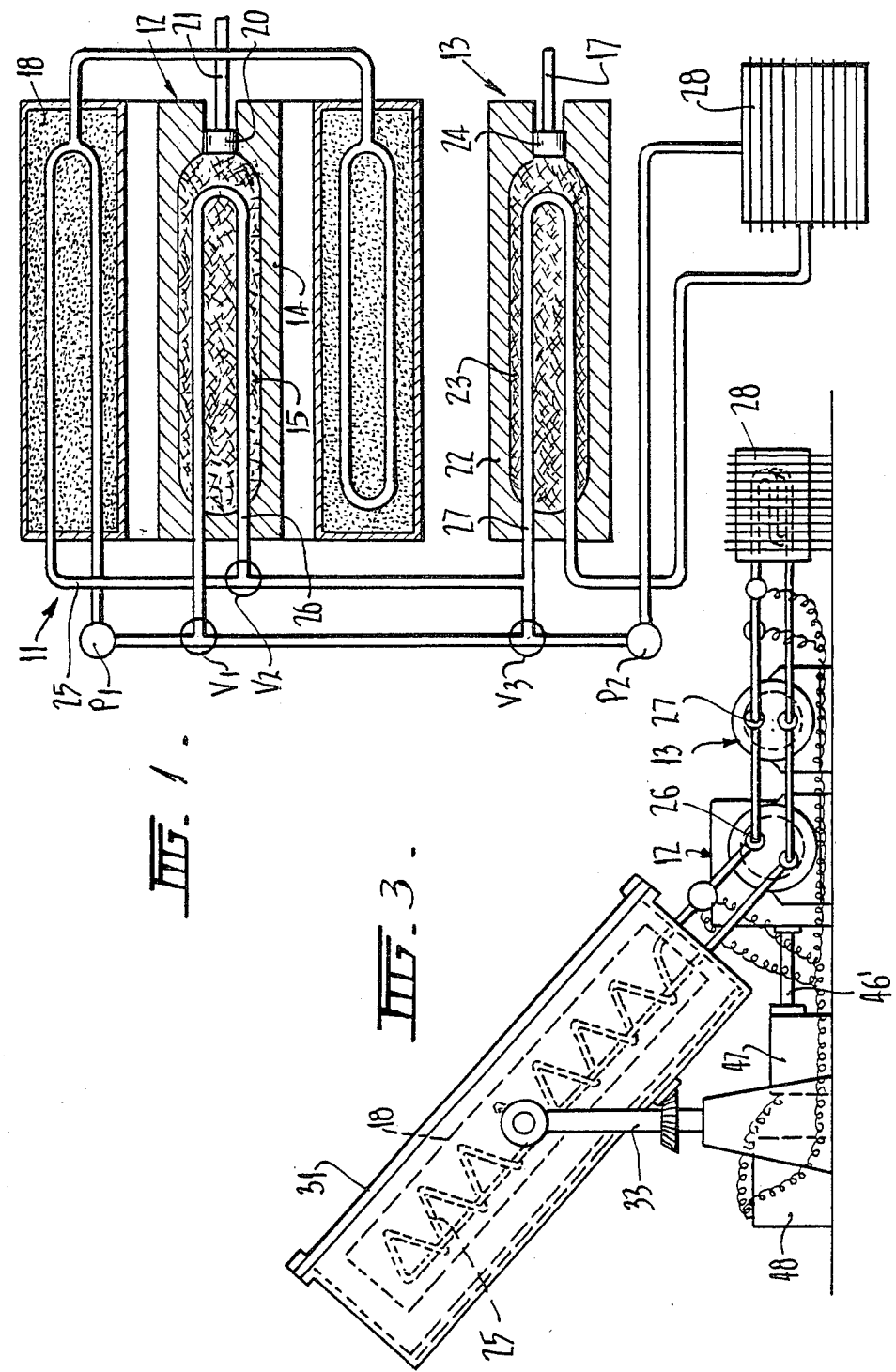

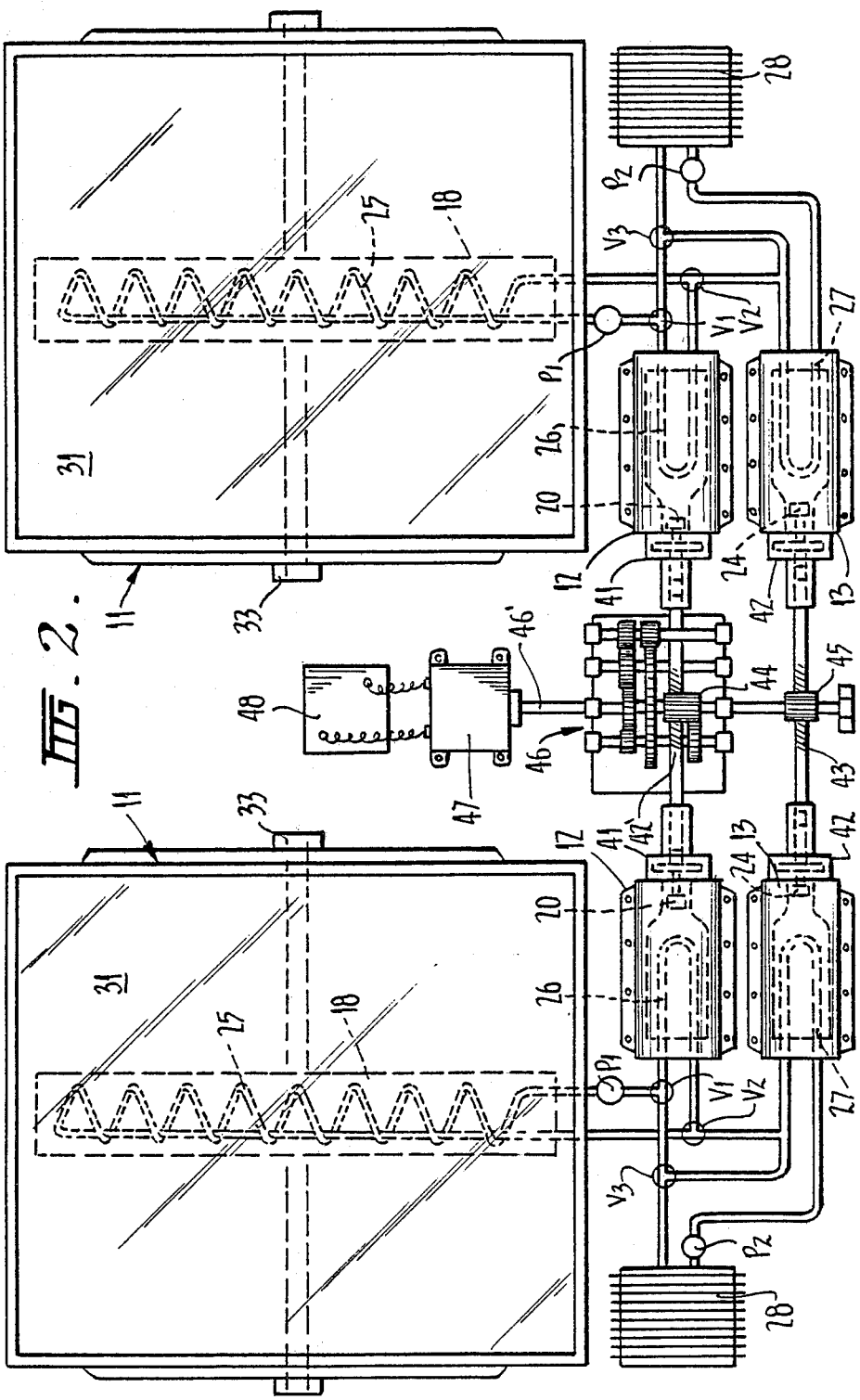

METHOD AND APPARATUS FOR OBTAINING
WORK FROM HEAT ENERGY

FIELD OF THE INVENTION

This application is a continuation-in-part of application Ser. No. 066,232, filed Aug. 13, 1979, now abandoned.

This invention provides a novel manner and means for obtaining useful mechanical work from heat energy.

The invention is particularly, but not exclusively, applicable to derivation of work from heat energy sources of low concentration, such as solar radiation and waste heat from industrial processes and machines. The work so derived may be used for any of a variety of purposes but one particularly useful application of the invention is in the conversion of solar energy to electrical power.

SUMMARY OF THE INVENTION

According to the invention there is provided a method of obtaining mechanical work from heat energy comprising heating a body of metal or metal alloy confined within a pressure vessel having a co-efficient of volume expansion less than said body of metal or metal alloy contained therein thereby to generate an increase in pressure within the vessel and causing the increased pressure to move a load thereby to do work.

PREFERRED ASPECTS OF THE INVENTION

Preferably the metal or metal alloy is in a liquid or plastic state throughout the heating step or passes from plastic to liquid state during heating.

Preferably said metal or metal alloy has a coefficient of volume expansion greater than $10 \times 10^{-6}$ ml/ml/°K. and a melting point or melting range such that the liquidus temperature does not exceed 939° K. More particularly it is preferred that said metal or metal alloy have a coefficient of volume expansion within the range $6 \times 10^{-5}$ ml/ml/°K. and $60 \times 10^{-5}$ ml/ml/°K. and a melting point or melting range such that the liquidus temperature does not exceed 550° K. and the solidus temperature is not less than 200° K.

Preferably further said metal or metal alloy has a thermal capacity (specific heat) falling within the range 0.12 Joules/g/°K. to 2.0 Joules/g/°K.

Said body may be comprised of any one or more of the metals comprising the Group 1A metals and magnesium, zinc, calcium, aluminum, manganese, strontium, cadmium, indium, tin, mercury, barium, lead or their alloys.

The pressure vessel may be made of steel or preferably ceramic materials or metals such as tungsten, molybdenum, titanium or a low expansion alloy such as Invar, Kovar or Nilo K. Where, for reasons of cost, the pressure vessel is made of steel or of a low expansion alloy such as Invar, Kovar or Nilo K, a thermal barrier layer is introduced between the liquid metal of the core and the pressure vessel walls, because these materials have higher thermal conductivities than ceramic materials or tungsten, molybdenum or titanium and, in the absence of the thermal barrier layer, considerable energy could be expended in heating the material of which the pressure vessel is made and in conduction losses through the pressure vessel walls to the environment.

Said body of metal or metal alloy may be heated during spaced time intervals and be cooled or allowed to cool during the intervening time intervals so as to produce work cyclically during the heating intervals. In this case the pressure generating device comprised of said body of metal or metal alloy and the pressure vessel may be one of a plurality of similar devices operated both simultaneously or cyclically out of phase with one another to produce a substantially continuous work output.

Said body of metal or metal alloy may be heated and/or cooled by direct thermal transfer through the pressure vessel and/or by heat exchange between an external heat reservoir and said body.

Said increased pressure in the pressure vessel may be caused to move the load by movement of a piston or other pressure sensitive element in response to said increased pressure and said element may be returned to its original position on cooling of said body of metal or metal alloy by energy storage means, for example spring means, or, in the case where a plurality of similar pressure generating devices are operated cyclically, by expending part of the work produced by one device to impart a return movement to the respective element of another device.

The work done by the method of the present invention may constitute part or all of a work input for any work consuming device or process. The invention specifically extends to a process for generating electrical power wherein an electrical power generator receives a work input by performance of the above defined method.

The invention also extends to apparatus for deriving mechanical work from heat energy comprising a body of metal or a metal alloy confined within a pressure vessel having a coefficient of volume expansion less than said body of metal or metal alloy confined therein and means adapted in use of the apparatus to move a load in response to an increase in pressure within the pressure vessel.

The apparatus may also include means to apply heat to said body of metal or metal alloy. Such means may comprise means to collect solar radiation and to apply heat energy from such radiation to such body of metal or metal alloy.

BRIEF DESCRIPTION OF THE VIEWS OF THE DRAWINGS

In order that the invention may be more fully explained one particular type of heat conversion device, and the manner in which this type of device may be applied to the conversion of solar energy to electrical power, will be described with reference to the accompanying drawings in which:

FIG. 1 is a diagrammatic representation of the heat conversion device,

FIG. 2 is a schematic plan view of equipment incorporating a pair of such devices and capable of converting solar energy to electrical power, and FIG. 3 is a schematic side elevation of the equipment shown in FIG. 2.

DETAILED DESCRIPTION WITH RESPECT TO THE DRAWINGS

The heat conversion device illustrated in FIG. 1 is denoted generally as 11. It comprises a main high pressure generator unit 12 and an auxiliary or low pressure generator unit 13. Main unit 12 comprises a cylindrical pressure vessel 14 charged with a body of liquid metal 15 which will be termed the "core" of the unit. This core is in contact with a movable piston 20 connected to a shaft 21.

Main unit 12 is surrounded by a thick walled metal cylinder 18 which, in use of the apparatus, serves as a heat reservoir in a manner to be described.

The auxiliary low pressure generator unit 13 comprises a cylindrical pressure vessel 22 charged with a body or core of liquid metal 23 in contact with an output piston 24 connected to a shaft 17.

The apparatus is provided with a heating and cooling circuit which is charged with a heat transfer medium, preferably a liquid metal. This circuit incorporates pumps P1, P2 and valves V1, V2, V3 whereby the heat transfer medium can be pumped in a selective manner through ducts 25 formed in the metal cylinder 18, a duct 26 extending through the liquid metal core 15 of the main pressure generating unit 12, a duct 27 extended through the liquid metal core 23 of the low pressure generating unit 22 and also through an external cooler 28.

During operation of the apparatus illustrated in FIG. 1 heat such as from solar radiation is focused continuously onto cylinder 18. Cylinder 18 thus receives heat energy and it serves as a heat reservoir during the following sequence of operations.

Liquid metal from the heat reservoir cylinder 18 is circulated through valves V1 and V2 by means of pump P1 to circulate heat transfer medium between ducts 25 in the heat reservoir cylinder 18 and duct 26 in the liquid metal core 15 of main unit 12. Thus heat is transferred from heat reservoir cylinder 18 into liquid metal core 15 by the recirculating heat transfer medium which extracts heat as it passes through ducts 25 and delivers heat to core 15 as it psses through duct 26.

The heating of liquid metal core 15 causes it to expand at a greater rate than pressure vessel 14. This volumetric expansion generates within the vessel a high pressure which is applied directly to output piston 20. Thus output piston 20 can apply a large force to an external load as will be described below.

When the liquid metal core 15 has reached its maximum operating temperature the valves in the heating-/cooling circuit are operated so that heat transfer medium passes via valve V2 to duct 27 in the liquid metal core 23 of the low pressure generator unit 13 and thence through cooler 28 and valve V1 into duct 26. Thus the liquid metal core 23 of low pressure unit 13 is heated and the liquid metal core 15 of the main unit is forcibly cooled, resulting in expansion of the core 23 of low pressure unit 13 and an output force on piston 24 during the time that core 15 of the main unit cools and piston 20 is retracted. Retraction of the piston may be achieved by an energy storage device such as a spring or by operating two units cyclically out of phase with one another as described below. Subsequently valve V3 is operated to cause recirculation of heat transfer liquid from cooler 28 back through the low pressure core 23 so as to cool that core during the interval when core 15 of the main unit is being heated.

FIGS. 2 and 3 illustrates one arrangement by which heat conversion devices of the type illustrated in FIG. 1 can be used in the conversion of solar energy to electrical power. The equipment of FIGS. 2 and 3 incorporates a pair of heat conversion devices 11 arranged to receive solar energy from an associated pair of solar collectors in the form of trough reflectors 31 or arranged so that the reflectors direct incident radiation in convergent lines which fall on the cylinder 18 of the respective device. Each reflector may be driven by a conventional tracking device 33 so as to track the sun throughout the day.

The output pistons 20 and 24 of the two devices 11 are connected to hydraulic intensifiers 41 and 42 to increase the length of the stroke. The pistons within the intensifiers are connected to racks 42 and 43 which drives pinion gears 44 and 45 during the extension strokes. The pinion gears 44 and 45 then drive gears 46 to increase shaft speed of an output shaft 46'. The output shaft 46' is coupled to a conventional electric power generator 47 which may be connected to a storage battery 48.

The two heat conversion devices are operated cyclically in opposition to one another so that as the high pressure core of one device is being heated to apply pressure to the respective hydraulic intensifier the corresponding core of the other device is being cooled and the cores of the low pressure units are likewise heated and cooled in opposite phase. The two devices can thus be operated to provide a substantially continuous power output.

THEORETICAL CONSIDERATIONS

Quite obviously the outputs obtainable from apparatus of the illustrated type is critically dependent on the properties of the core material. This material should have a high thermal expansion and low compressibility. In the solid state, volume expansion is an average of the expansion in the direction of individual crystallographic axes. Some planes of atoms are more closely packed than others and the consequent distance between atoms is dependent on atomic binding forces, which governs expansion in an approximate inverse relationship. It is possible to deliberately confer preferred directional properties in materials during casting or rolling to improve linear coefficients of expansion. Overall, of course, the volume expansion would remain constant. Generally speaking "hard" solid state expansion would not be used to generate useful forces since the expansion coefficients of the constructional materials are small. It is therefore preferred that the core material either remain in the liquid state or that it be at solidification temperature or possibly a few degrees below that temperature when the material would still be soft and plastic. In the liquid state or during fusion some anisotropy in expansion still exists but the influence is minimal and may be ignored.

Compressibility is related inversely to atomic binding energies and therefore similarly with expansion. A compromise therefore has to be reached with consideration to other pertinent physical properties.

Heating of the core material is intended to be by relatively low input energy concentration and transferred to the expandant in any convenient way, such as via ducts or pins through the pressure vessel walls. Therefore to obtain the maximum differential expansion the thermal capacities and densities of the expandant must be favourable to allow its temperature to be raised to the highest possible in a minimum of time. The most favourable are the Group 1A metals and magnesium, zinc, calcium, aluminium, manganese, strontium, cadmium, indium, tin, mercury, barium, lead and their alloys.

Some typical average properties of Group 1A (solid) metals are shown in a Table after Hume-Rothery "Structure of Metals and Alloys".

TABLE I

| Element | Linear Expansion (R.T. to Melting Pt.) | Specific Heat J/g/°C. | Compressibility Cm$^2$/Kg | Density g/ml | M.Pt °K. |
|---|---|---|---|---|---|
| Lithium | $45 \times 10^{-6}$ | 3.25 | — | 0.53 | 381.5 |
| Sodium | $70.6 \times 10^{-6}$ | 1.19 | $15 \times 10^{-6}$ | 0.97 | 370.8 |
| Potassium | $83.0 \times 10^{-6}$ | 0.74 | $29 \times 10^{-6}$ | 0.86 | 336.7 |
| Rubidium | $88.0 \times 10^{-6}$ | 0.33 | $31 \times 10^{-6}$ | 1.53 | 311.9 |
| Caesium | $97.0 \times 10^{-6}$ | 0.206 | $40 \times 10^{-6}$ | 1.9 | 301.7 |

Of these elements Lithium is the least suitable because of its high specific heat and high melting point. Caesium and Rubidium although having the more favourable properties are rare and expensive. Potassium and sodium are readily available and quite cheap.

An initial arbitrary study was made for the pressure×displacement characteristics of potassium if heated through the solid—fusion and liquid states.

Let the sun's energy fall on an area of one square meter of a curved reflector and be directed onto a very thin walled tube of suitable material such as surface treated aluminium or copper alloy. By means of fins, let this heat be transferred through the walls of a refractory pressure vessel containing a rod of potassium of a certain volume, say 6.3 sq. cm. cross-sectional area×1 meter long.

Exposed to the sun on a clear day the total energy (E) concentrated on the collector tube is assumed as a maximum of 1000 J/s.

The temperature rise of the collector tube may be expressed as E×Absorption Coeff.—Heat Lost to surroundings—Heat Transferred to the potassium core.

With recent advances in absorptive coatings the absorption coefficient should be better than 0.95. Assuming the element is enclosed in a draught free box and evacuated to reduce environmental heat losses to a negligible value, the energy available to heat the core would be:

182×0.95−950 Joules/sec.

available to:
a. Heat the tube and maintain at some high temperature
b. By transfer, heat the core.

If the potassium could be heated and its temperature raised by 80° C. i.e. 20°–100°, the input energy would have to be:

Mass×Specific Heat×Temperature rise+Latent Heat of Fusion.

giving:

| | |
|---|---|
| Solid State (20–64° C.) | 542 g × 0.948 × 44 = 22598 Joules. (33.5 seconds) |
| Fusion | 542 g × 60.2 (LHƒ) = 35057 Joules. (51.9 seconds) |
| Liquid State (64–100° C.) | 542 g × 0.78 × 36 = 15273 Joules. (22.6 seconds) |
| Total | 72,928 Joules. | at an insolation rate of 950 Joules/sec, the time necessary is 72.9 seconds.

Expansion resulting from heating.

Solid $630 \times 3 \times 83 \times 10^{-6} \times 44 = 6.9$ ml.
Fusion 0.9 ml*/46.3 ml (molecular Volume - 12.4 ml change at 64° C.)

*From Introduction to Chemical Physics by J. C. Slater.
Value quoted in Liquid Metals Handbook is 2.4% Volume increase at fusion.
Liquid $649.3 \times 33 \times 10^{-5} \times 36 = 7.7$ ml. TOTAL $\Delta V = 27.0$ ml/72.9 seconds.

The corresponding changes in pressure coincident with these volume changes are:

Solid State

The pressure may be derived from $$P_1 - P_2/V_0 - V_1/V_0 = \text{Bulk Modulus or } \frac{1}{\text{Compressibility}}$$

$$P = \frac{1 \times 6.9}{630 \times 29 \times 10^{-6}} = 378 \text{ Kg/cm}^2 \text{ (5368 lb/in}^2\text{)}$$

Fusion

The compressibility may be calculated themodynamically as $$\frac{\Delta S}{\Delta V} = \frac{\text{Expansion Coeff.}}{\text{Compressibility}}$$

where $\Delta S$ is the increase in entropy at fusion $\Delta V$ is the increase in volume at fusion. Thus the compressibility is:

$$\frac{25 \times 10^{-5} \times 0.9}{46.3 \times 0.15}$$

Bulk Modulus = $0.309 \times 10^5$ Kg/cm$^2$ $P = 605$ Kg/cm$^2$ (8587 lb/sq. in.)

The $\Delta S$ value of 0.15 is the calculated entropy at fusion (after Slater). Observed value by experiment is 1.72. Adiabatic compressibility according to Liquid Metals Handbook at fusion is $32.4 \times 10^{-6}$ and therefore corresponds closely to the theoretical values of $\Delta S$ rather than those observed.

Liquid State

Expansion in the liquid state has been calculated from data of densities of various liquid metals at different temperatures contained in Handbook of Liquid Metals. Similarly the compressibility is quoted at $36.2 \times 10^{-12}$ cm$^2$/dyne.

$$P = \frac{0.29 \times 10^5 \times 7.6}{649.3} = 339 \text{ Kg/cm}^2 \text{ (4820 lb/in}^2\text{)}$$

Total pressure generated during the temperature rise is 1324 Kg/mm$^2$ (18775 lb/sq.in.) Maximum power available:

$$\frac{\text{Force} \times \text{Displacement (ft. lb.)}}{\text{Time (sec)}} =$$

$$\frac{18775 \times 27.0 \times 61 \times 10^{-3}}{12. \times 72.9} =$$

35.4 ft. lb/sec/m$^2$ of area insolated = 33.2 W/m$^2$ (86 MW/mile$^2$)

In view of the encouraging results obtained by the arbitrary study, the relative work capabilities i.e. generated pressure/unit time in the various states were more closely examined for the other Group 1A elements.

A simplified model indicating the comparative usefulness of each element in each state was constructed from their various physical properties.

VOLUME INCREASE OF SOLID METAL a. Original Volume $(V_o) \times$ coeff. of cubical expansion $(\alpha) \times$ Temp. Rise (°C.) = $\Delta V$.

b. Time for volume increase ($\Delta V$):

$V_o \times$ density $(\rho) \times$ specific heat $(C_p) \times$ Tem. Rise/Input energy (F-Joules/sec).

Thus A/$b$ = Volume change/unit time. Pressure due to $$\Delta V = P = \frac{\Delta V}{V_o \times \text{compressibility }(X)}$$

Thus pressure increase/unit time for a given Volume is:

$$P = \frac{V_o \times \alpha\text{cub.} \times (T_m - T_o) \times F}{(V_o)^2 \times X \times \rho \times (T_m - T_o) \times C_{p(solid)}}$$

$$= \frac{F}{V_o} \cdot \frac{\alpha\text{cub}}{\rho \cdot X \cdot C_{ps}} \text{ or } C^{Solid} \cdot \frac{\alpha\text{cub}}{\rho \times X \times C_{p(Solid)}}$$

VOLUME INCREASE AT FUSION $\Delta V_f = v_{m.p.t.} \times$ molecular vol. change at Fusion ($\Delta V_{mf}$)

$$\text{Time} = \frac{V_o \times \rho \times \text{Latent Heat of Fusion } (L_f)}{F}$$

$$\frac{\Delta V_f}{t} = \frac{V_m \times \Delta V_{mf} \times F}{V_o \times \rho \times L_f}$$

$$\text{Pressure generated} = \frac{\Delta V_f}{V_m \cdot X} = \frac{\Delta V_{fm} \times F}{\rho \cdot L_f \cdot X \cdot V_o}$$

$$= C^{fus.} \cdot \frac{\Delta V_{mf}}{\rho \cdot L_f \cdot X} \text{ kg/cm}^2/\text{sec/m}^2 \text{ of solar insolation}$$

VOLUME INCREASE IN LIQUID STATE

May be similarly derived and is $$C^{liq.} \cdot \frac{\alpha_v}{\rho \cdot X \cdot C_{pl}}$$

With constant energy input the pressure generated by unit volume in unit time may readily be determined. Table II shows the various properties where available, and their relative calculated pressures. Any of the properties not available have been assumed from the relationship with those properties of other elements in the same periodic atomic groupings or by other calculations.

Having arrived at the required data shown in Table II, the example quoted for a heated rod of Potassium is repeated for the case of a similar rod of Rubidium, giving the values in the solid, fusion and liquid states of:

33.3, 41.7 and 36 W/m² respectively.

The major advantage of Rb being the low latent heat of fusion as compared with Potassium and its low thermal capacity.

It would appear from the figures in Table II that cycling rapidly within temperature limits, a few degrees below and above the melting point of the chosen metal or alloy, would produce the highest work values. For practical application and ease of manufacture the use of alloys which are liquid at ambient would be the most convenient.

Melting points of expandant materials are limited only by the hot strengths of materials suitable to manufacture of the pressure vessel for withstanding the generated pressures. However, there is little point to heat to above a maximum of 923° K. since energies required to achieve higher temperatures could be converted to force more efficiently by other means.

Heating by less concentrated energy sources such as solar radiation, efflux from gas, oil or steam turbines etc., require low melting point metals or alloys to attain maximum efficiency arising from volume changes during fusion or heating in the liquid states. Melting points should be low and not exceeding 573° K., preferably below or close to ambient.

TABLE II

| ELEMENT | | M. pt. °K. | Coeff. of Exp. (solid) $\alpha$ cub. ml/ml | Mol. Vol. Change $\Delta$ MV % | Coeff. of Exp. (liquid) $\alpha$ Vol. | Density $\rho_o$ g/ml | Compressibility | | |
|---|---|---|---|---|---|---|---|---|---|
| | | | | | | | $X_{Solid}$ cm²/kg | $X_{Fusion}$ cm²/kg | $X_{Liquid}$ cm²/kg |
| Na | | 370.8 | 21.2 × 10⁻⁵ | +2.5 | 28.9 × 10⁻⁵ | .97 | 15 × 10⁻⁶ | 17 × 10⁻⁶ | 19.2 × 10⁻⁶ |
| K | | 336.7 | 24.9 × 10⁻⁵ | +2.41 | 32 × 10⁻⁵ | .86 | 29 × 10⁻⁶ | 32.4 × 10⁻⁶ | 36.7 × 10⁻⁶ |
| Rb | | 311.9 | 26.4 × 10⁻⁵ | +2.5 | 33.9 × 10⁻⁵ | 1.53 | 31 × 10⁻⁶ | 34.6 × 10⁻⁶ | 39.1 × 10⁻⁶ |
| Cs | | 301.7 | 29.1 × 10⁻⁵ | +2.6 | 36.6 × 10⁻⁵ | 1.84 | 40 × 10⁻⁶ | 44.6 × 10⁻⁶ | 50.4 × 10⁻⁶ |
| ALLOY | | | | | | | | | |
| Na | 56% | 292 | — | +2.5 | 29.5 × 10⁻⁵ | — | — | — | — |
| K | 44% | | | | | | | | |
| Na | 22% | 262 | — | +2.5 | 30.96 × 10⁻⁵ | — | — | — | — |
| K | 78% | | | | | | | | |
| 42 | Sn | | | | | | | | |
| 14 | Cd | 366 | — | — | — | — | — | — | — |
| 44 | In | | | | | | | | |

| ELEMENT | Specific Heat $C_{psolid}$ J/g/°C. | $C_{pliquid}$ J/g/°C. | Latent Heat of fusion $L_f$ J/g | Pressure generated/second Kg/cm²/sec (For $V_o$ & F Values quoted) | | |
|---|---|---|---|---|---|---|
| | | | | Solid | Fusion | Liquid |
| Na | 1.19 | 1.36 | 113.3 | 17.4 | 19.5 | 16.4 |

TABLE II-continued

|   |   | | | | | | |
|---|---|---|---|---|---|---|---|
| K |     | .74 | .81 | 60.2 | 19.3 | 20.5 | 18.0 |
| Rb |    | .33 | .37 | 25.1 | 24.1 | 26.8 | 22.1 |
| Cs |    | .206 | .25 | 15.5 | 26.4 | 28.1 | 22.8 |
| ALLOY | | | | | | | |
| Na | 56% | 1.06 | 1.11 | — | | | |
| K | 44% | | | | | | |
| Na | 22% | .906 | .99 | — | | | |
| K | 78% | | | | | | |
| 42 | Sn | | | | | | |
| 14 | Cd | — | — | — | | | |
| 44 | In | | | | | | |

The pressure vessel, whilst requiring favourable elastic properties should have the lowest expansion characteristic possible and a low thermal conductivity. These vessels may be manufactured from ceramic or metals such as tungsten, molybdenum, or titanium or low expansion alloys such as Invar, Kovar or Nilo K.

When considering economics, the thermally ideal materials such as ceramics, for example, alumina, porcelain, etc., or metals having low expansion and thermal conductivity properties such as tungsten, molybdenum or titanium introduce elements of cost which may make large force generator units not cost effective. The low expansion alloys, such as Invar, Kovar or Nilo K, or common constructional materials such as steel, reduce the cost but these materials have higher thermal conductivities than the aforementioned ceramic materials or tungsten, molybdenum or titanium, and significant energy could be expended in heating the material of which the pressure vessel is made and in conduction losses through the pressure vessel walls to the environment. Where the pressure vessel is made of steel, or preferably alloys such as Invar, Kovar or Nilo K, it is necessary to introduce a thermal barrier between the liquid metal of the core and the pressure vessel walls. With quick temperature cycling this barrier layer need only be a thin layer and may be readily applied for example, by coating the inside wall of the pressure vessel with glass or by plasma spray deposition of alumina or other refractory materials.

The effect of the thermal barrier may be graphically illustrated by taking a square centimeter of surface area of the internal wall of a steel pressure vessel. In one case a barrier layer of 0.025 cm. (0.010") of glass is added. In the other case no barrier layer is added but the heat flow through the inner 0.025 cm. of the vessel wall is determined for comparison.

INSULATED CYLINDER

Heat Flow/Unit of time through the barrier layer $$\frac{d\theta}{dt} = \frac{K}{d}$$

$K$ = Thermal Conductivity of glass $d$ = Thickness $$= \frac{0.0025}{0.025}$$

$$= 0.1 \text{ cals/sec/}°C.$$

NON-INSULATED CYLINDER $$\frac{d\theta}{dt} = \frac{0.12}{0.025}$$

$$= 4.8 \text{ cals/sec/}°C.$$

Without the barrier layer heat is transferred to the pressure vessel wall for conduction to the environment approximately 50 times faster than if the wall contains a thin refractory lining.

The actual rate at which heat is lost to the environment is dependent on the thickness of the walls and insulating lining. However, using the example above, if the liquid metal inside the cylinder is at a temperature of 100° C. and the environment temperature is 20° C., under steady state conditions, heat flowing/square centimeter of wall area and 1 cm. total thickness would be:

INSULATED $$\frac{dQ}{dt} = \frac{\theta_1 - \theta_2}{\frac{d_1}{K_1 A} + \frac{d_2}{K_2 A}}$$

where $d_1$ = Thickness of lining
$K_1$ = Conductivity of lining
$d_2$ = Thickness of shell
$K_2$ = Conductivity of shell
$\theta_1$ = 100° C.
$\theta_2$ = 20° C.

$$= 4.42 \text{ cals/sec.}$$

NON-INSULATED $$\frac{dQ}{dt} = \frac{\theta_1 - \theta_2}{\frac{d}{KA}}$$

$$= \frac{80}{\frac{1}{.12 \times 1}}$$

$$= 9.53 \text{ cals/sec.}$$

The heat transfer medium for the internal heater/cooler system may be a liquid metal, preferably having a melting point below 0° C. and preferably based on the Na-K or Na-K-Rb systems.

The illustrated apparatus has been advanced by way of example only and it could be modified considerably without departing from the scope of the invention. For example the heat collector may be made large and therefore capable of storing considerable energy to cyclically or concurrently feed the heated liquid metal into several cylinders located separately from it and thus capable of producing a continuous or peak power output respectively. Suitable valve arrangements could regulate flow from the heat collector to the pressure generating cylinders to allow flexibility and control of power output. Moreover the invention is in no way limited to the production of electrical power. There are many other applications, particularly in the agricultural and mining industries, in which work may be performed in a cyclic manner. For example the invention can be applied to the operation of irrigation gates or sprinkler devices which need to be opened or turned on at sunrise and closed or turned off at sunset or to the drying of grain or minerals which might be exposed to sunlight for drying but protected during periods of rainfall. Moreover, the invention is not limited to the use of solar energy and may be applied to the retrieval of useful heat energy from other thermal equipment, such as from the exhaust system of generators, boilers and turbines.

Modifications and adaptations may be made to the above described without departing from the spirit and scope of this invention which includes every novel feature and combination of features disclosed herein.

The claims form part of the disclosure of this specification.

It is claimed:

1. A method of obtaining mechanical work from heat energy comprising heating a body of liquid metal or liquid metal alloy confined within, but thermally insulated from, a pressure vessel having a coefficient of volume expansion less than said body of metal or metal alloy contained therein thereby to generate a volumetric expansion of said body whereby to cause an increase in pressure within the vessel and causing the increased pressure to move a load thereby to do work.

2. A method as claimed in claim 1, wherein said metal or metal alloy has a coefficient of volume expansion greater than $10 \times 10^{-6}$ ml/ml/°K. and a melting point or melting range such that the liquidus temperature does not exceed 939° K.

3. A method as claimed in claim 1, wherein said metal or metal alloy has a coefficient of volume expansion within the range $6 \times 10^{-5}$ and $60 \times 10^{-5}$ ml/ml/°K. and a melting point or melting range such that the liquidus temperature does not exceed 550° K. and the solidus temperature is not less than 200° K.

4. A method as claimed in claim 1, wherein said metal or metal alloy has a thermal capacity falling within the range 0.12 Joules/g/°K. to 2.0 Joules/g/°K.

5. A method as claimed in claim 1, wherein said body of metal or metal alloy is selected from the group consisting of Group IA metals, magnesium, zinc, calcium, aluminum, manganese, strontium, cadmium, indium, tin, mercury, barium and lead or combinations thereof.

6. A method as claimed in claim 1, wherein said pressure vessel comprises a material of low thermal expansion and low thermal conductivity selected from the group consisting of ceramic material, metals selected from the group consisting of tungsten, molybdenum, titanium, and metal alloys selected from the group consisting of Invar, Kovar, and Nilo K, said metal alloys being coated with a thermally insulating layer.

7. A method as claimed in claim 1, including so heating said body of metal or metal alloy during spaced time intervals and cooling or allowing said body of metal to cool during the intervening time intervals so as to cyclically produce work and further comprising heating at least one other such body of metal or metal in a respective number of such pressure vessels and combining the work outputs thereof.

8. Apparatus for deriving mechanical work from heat energy comprising a device comprising a body of metal or metal alloy, a pressure vessel confining but thermally insulated from said body of metal or metal alloy, the pressure vessel having a co-efficient of volume expansion less than that of said body of metal or metal alloy confined therein, and means adapted in use of the apparatus to move a load in response to an increase in pressure within the vessel consequent on heating of said body of metal or metal alloy.

9. Apparatus as claimed in claim 8, including means for applying heat to said body of metal or metal alloy.

10. Apparatus as claimed in claim 9, wherein said means includes means for collecting solar radiation and applying heat energy from said radiation to said body of metal or metal alloy.

11. Apparatus as claimed in claim 8, including a plurality of such devices and including means for combining the work output of said devices.

12. A method of obtaining mechanical work from heat energy comprising:
 (a) confining within a pressure vessel a core material of metal or metal alloy having a coefficient of volume expansion greater than said pressure vessel;
 (b) arranging movable member in communication with said core material for relative movement with respect to said vessel;
 (c) thermally insulating the core material from the internal surfaces of said vessel;
 (d) thermally insulating a heat reservoir from said core;
 (e) pumping a heat transfer medium through said reservoir to receive heat by indirect exchange with said reservoir;
 (f) heating said core material by pumping the heated medium from the reservoir through the core material for indirect heat exchange with the metal or metal alloy and thereby effecting volumetric expansion of the core material and increasing the pressure within the vessel to move the movable member relative to the pressure vessel.

13. The method according to claim 12 wherein the reservoir is in the form of a cylinder substantially circumscribing the pressure vessel.

14. The method according to claim 12 wherein the metal or metal alloy comprising the core material is a liquid metal or liquid metal alloy and the heat exchange medium is a liquid metal or liquid metal alloy pumped through a circuit connecting the reservoir with the core material.

15. A method of obtaining mechanical work from heat energy comprising:
 (a) confining within a pressure vessel a core material of metal or metal alloy having a coefficient of volume expansion greater than that of said pressure vessel;
 (b) arranging a movable member in communication with said core material for relative movement with respect to said vessel;
 (c) thermally insulating the core material from the internal surfaces of said vessel;
 (d) pumping a liquid metal or liquid metal alloy heat transfer medium through a reservoir to receive heat by indirect exchange with said reservoir;
 (e) heating said core material by pumping the heated liquid from the reservoir through the core material for indirect heat exchange with the metal or metal alloy and thereby effecting volumetric expansion of the core material and increasing the pressure within the vessel to move the movable member relative to the pressure vessel.

16. A method of obtaining mechanical work from heat energy comprising:
 (a) confining within a pressure vessel a core material of metal or metal alloy having a coefficient of volume expansion greater than that of said pressure vessel, the metal or metal alloy comprising the core material being a liquid metal or liquid metal alloy;
(b) arranging a movable member in communication with said core material for relative movement with respect to said vessel;
(c) thermally insulating the core material from the internal surfaces of said vessel;
(d) providing a heat reservoir thermally insulated from said core material;
(e) pumping a liquid metal or liquid metal alloy heat transfer medium through said reservoir to receive heat by indirect exchange with said reservoir;
(f) heating said core material by pumping the liquid metal or liquid metal alloy heat transfer medium through a circuit connecting the reservoir with the core material for indirect heat exchange with the metal or metal alloy and thereby effecting volumetric expansion of the core material and increasing the pressure within the vessel to move the movable member relative to the pressure vessel.

* * * * *